United States Patent
Tokura (10) Patent No.: US 7,301,647 B2
(45) Date of Patent: Nov. 27, 2007

(54) METHOD FOR REGULATING SHAPE OF FLOATATION SURFACE OF SLIDER FLOATING ABOVE RECORD CARRIER

(75) Inventor: Fumihiko Tokura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 10/201,478

(22) Filed: Jul. 23, 2002

(65) Prior Publication Data
US 2003/0142323 A1 Jul. 31, 2003

(30) Foreign Application Priority Data
Jan. 31, 2002 (JP) .............................. 2002-024649

(51) Int. Cl.
| | |
|---|---|
| G01B 11/24 | (2006.01) |
| G01B 11/30 | (2006.01) |
| G11B 5/60 | (2006.01) |
| G11B 15/64 | (2006.01) |
| G11B 17/32 | (2006.01) |
| G11B 21/20 | (2006.01) |
| G11B 5/127 | (2006.01) |
| H04R 3/00 | (2006.01) |
| G01C 17/00 | (2006.01) |
| G01C 9/00 | (2006.01) |
| G01C 19/00 | (2006.01) |
| G06F 15/00 | (2006.01) |
| B29C 35/08 | (2006.01) |
| B23K 26/00 | (2006.01) |
| B23K 26/02 | (2006.01) |

(52) U.S. Cl. ................. 356/601; 360/234.3; 29/603.09; 29/603.1; 702/152; 264/400; 219/121.69; 219/121.83; 219/121.85

(58) Field of Classification Search ................. 356/601
See application file for complete search history.

(56) References Cited

U.S. PATENT DOCUMENTS

| | | | | |
|---|---|---|---|---|
| 6,321,440 | B1 * | 11/2001 | Crawforth et al. | 29/603.1 |
| 6,477,013 | B1 * | 11/2002 | Kang et al. | 360/236.3 |
| 6,548,009 | B1 * | 4/2003 | Khlif et al. | 264/400 |
| 6,710,295 | B1 * | 3/2004 | Tam et al. | 219/121.85 |
| 2001/0056334 | A1 * | 12/2001 | Matsushita | 702/150 |
| 2003/0019095 | A1 * | 1/2003 | Chang et al. | 29/603.09 |
| 2005/0180051 | A1 * | 8/2005 | Chang et al. | 360/234.3 |

FOREIGN PATENT DOCUMENTS

| | | |
|---|---|---|
| JP | 2000-084620 | 3/2000 |
| JP | 2000-339894 | 12/2000 |
| JP | 2002008338 A * | 1/2002 |

* cited by examiner

*Primary Examiner*—Gregory J. Toatley, Jr.
*Assistant Examiner*—Gordon J. Stock, Jr.
(74) *Attorney, Agent, or Firm*—Greer, Burns & Crain, Ltd.

(57) ABSTRACT

A method for manufacturing a slider including a head for recording data into and reproducing data from a record carrier, and a floatation surface that floats above the record carrier includes the steps of setting an orthogonal coordinate system having an origin as a center of the floatation surface, and regulating a shape of the floatation surface by using laser to scan a rear surface of the floatation surface so that a flatness at each of plural positions set by the orthogonal coordinate system.

2 Claims, 8 Drawing Sheets

METHOD FOR REGULATING SHAPE OF FLOATATION SURFACE OF SLIDER FLOATING ABOVE RECORD CARRIER

BACKGROUND OF THE INVENTION

The present invention relates generally to a head and its manufacturing methods, and more particularly to control over a floatation amount of a head that floats above a disc surface. The present invention is suitable, for example, for a method for manufacturing a slider floating above a magnetic disc in a hard disc drive ("HDD").

Available electronic information content has explosively increased with recent rapid technology development, as in the Internet. Accordingly, smaller and larger-capacity magnetic disc drives, typified by HDDs, have been increasingly demanded to store such a large amount of information. An increased number of data tracks per unit length (or TPI: Track per Inch), that is, a narrow track width, is essential to realize a smaller and larger-capacity HDD. In addition, the improved control over a floatation amount and an attitude of a slider mounted with a head is also required for writing data onto and reading data from a narrow track. The term "floatation amount" means, in this application, a floatation amount and an attitude during the floatation, unless otherwise specified. In particular, as the floatation amount of the slider has been decreased recently, the stable recording/reproducing operations have required control over the stable floatation amount. The head cannot achieve recording and reproducing, when its floatation amount is excessively large, since the magnetic field for use with recording and reproducing becomes small in proportion to the square of a distance. The excessively small floatation amount results in a crash (i.e., damage to a disc).

The slider has an air-bearing surface ("ABS") that constitutes the floatation surface at a surface facing a disc, and it has been known that a shape or pattern of the ABS would stabilize the floatation amount. However, due to the residual stress generated at the time of processing a rear surface and the ABS of the slider, as well as the surface stress of the rear surface generated when the slider is bonded to a suspension, the ABS is warped like an ellipsoid, a paraboloid, or a hyperboloid, deviating from a desired shape. Therefore, the shape of the ABS should be measured, and then a correction or fine adjustment should be applied to the ABS when it is determined to be a bad shape.

One proposed method as a ABS-shape adjustment method has a laser irradiating onto the rear surface of the ABS to produce thermal stress and deform the rear surface minutely, thereby regulating a shape of the ABS, for example, as in Japanese Laid-Open Patent Application No. 6-84312. This adjustment method irradiates the laser to provide a crown or camber with a predicted deformed amount so that the ABS has a desired flat shape. Here, the crown is a swelling height on the slider in its longitudinal direction, whereas the camber (or often referred to as "cross-crown") is a swelling height on the slider in its transverse direction.

Nevertheless, the above reference does not disclose a concrete method of setting a laser irradiation condition and a laser oscillation condition (both are generalized as "laser irradiation condition" in this application) so as to flatten the shape of the ABS, after the shape of the ABS is evaluated, i.e., when the measurement shows that a crown and/or camber are outside the permissible range. Therefore, a shape correction process requires skill, making difficult the correction and increasing the correction time. In particular, the crown and camber are interrelated with each other. For example, when the crown is inside the permissible range while the camber is outside the permissible range, an arbitrary laser irradiation condition for correcting a camber would possibly cause the crown to be outside the permissible range. Thus, the correction process should consider the relationship between them, and this makes the correction more difficult and the correction time longer.

BRIEF SUMMARY OF THE INVENTION

Accordingly, it is an exemplary object of the present invention to provide a method for manufacturing a slider, which provides an easy and quick correction process for a shape of an ABS based on a shape evaluation result.

In order to achieve the above object, a method for manufacturing a slider of one aspect of the present invention, which slider includes a head for recording data into and reproducing data from a record carrier, and a floatation surface that floats above the record carrier includes the steps of setting an orthogonal coordinate system having an origin as a center of the floatation surface, and regulating a shape of the floatation surface by using a laser to scan a rear surface of the floatation surface so that each of plural positions set by the orthogonal coordinate system may possess flatness within a permissible range. This method controls a laser scan and the flatness at a finite number of positions defined by the orthogonal coordinate system. The present invention requires the flatness at a finite number of positions of the floatation surface, instead of the flatness for the entire floatation surface, and simplifies a shape adjustment. Such an orthogonal coordinate system is preferable, since it enables a laser scan angle to be easily set.

The regulating step may avoid irradiating the laser within a circular range with a predetermined radius having a center that accords with the origin. The instint inventor has experimentally confirmed that the laser irradiation in this range does not effect the shape adjustment of the floatation surface. The predetermined radius is calculated experimentally and, for example, is 50% or less of the orthogonal coordinate for a square-shaped laser irradiation range on the rear surface of the floatation surface.

A method for manufacturing a slider of another aspect of the present invention, which slider includes a head for recording data into and reproducing data from a record carrier, and a floatation surface that floats above the record carrier includes the steps of determining a correction target from among parameters based on a measurement result about the parameters, when the measurement result shows that at least one of the parameters deviate from a permissible range, the parameters including a crown representative of a deformation of the floatation surface in a longitudinal direction, a camber representative of a deformation of the floatation surface in a transverse direction orthogonal to the longitudinal direction, and a twist representative of a deformation of the floatation surface in a diagonal direction, setting a laser irradiation condition so as to correct the at least one parameter, and regulating a shape of the floatation surface by irradiating laser onto a rear surface of the floatation surface in accordance with the laser irradiation condition set by the setting step. This method sets the laser irradiation condition so as to correct a shape of the floatation surface with respect to at least one of the crown, camber and twist, for example, a parameter that has the largest error apart from the permissible range.

The method may further include the steps of judging whether the parameter other than the correction target is affected by the laser irradiation, deciding whether there is another irradiation condition having an effect similar to the laser irradiation when the judging step determines that the parameter other than the correction target is affected by the laser irradiation, and selecting one of the irradiation conditions which are made by adding a predetermined offset to and subtracting the predetermined offset from the laser irradiation condition, the one having less influence on the parameter other than the correction target, when the deciding step decides that there is no irradiation condition having a similar effect. Since the crown, camber and twist are inter-related with one another, this method prevents a correction of one of them from making the rest outside of the permissible range.

The laser irradiation condition may be an angle and a length for scanning the laser, an interval between laser spots, the number of pulses, pulse energy, and focusing of the laser. In addition, the laser irradiation condition may be a position and the number of irradiations where the laser is irradiated at the position plural times, an angle, a moving amount, and the number of times, where the laser is scanned at the angle while the angle is kept constant, then the laser is moved by the moving amount in a direction perpendicular to a scanning direction of the laser, and the laser scan is repeated plural times, and an angle and a moving amount, where the laser is scanned at the angle while the angle is kept constant, then the laser is moved by the moving amount in a direction perpendicular to a scanning direction of the laser while the moving amount is made variable. Moreover, the laser irradiation condition may be plural angles where the plural angles are set and each of the angles is used for scanning the laser, an angle and a scan length where plural scan lengths are set for each angle for scanning the laser, and an interval between laser spots of the laser and the number of times, where plural intervals are set and the laser is scanned at a different interval plural times.

A method for manufacturing a slider of still another aspect of the present invention, which slider includes a head for recording data into and reproducing data from a record carrier, and a floatation surface that floats above the record carrier, includes the steps of obtaining a relationship among a crown, a camber, and a twist when the laser is irradiated onto a rear surface of the floatation surface on a predetermined irradiation condition, the crown representing a deformation of the floatation surface in a longitudinal direction, the camber representing a deformation of the floatation surface in a transverse direction orthogonal to the longitudinal direction, and the twist representing a deformation of the floatation surface in a diagonal direction, and regulating, using the relationship, a shape of the floatation surface that has been previously processed, when at least one of the crown, the camber, and the twist deviates from a permissible range. This method also exhibits similar effects of those of the above methods.

A computer-implemented program for executing the above method, and a drive that includes a slider manufactured by the above method and drives the record carrier constitute one aspect of the present invention.

Other objects and further features of the present invention will become readily apparent from the following description of the embodiments with reference to accompanying drawings.

DETAILED DESCRIPTION OF THE INVENTION

Figure 1:
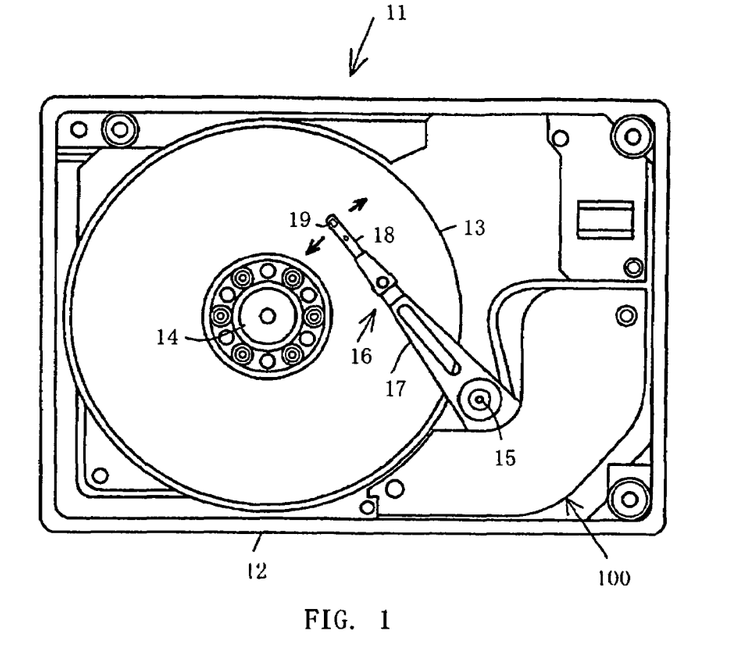
FIG. 1 is a plane view showing an internal structure of a hard disc drive as one example of the present invention.

Referring now to accompanying drawings, a description will be given of HDD 11 as one embodiment according to the present invention. The HDD 11 includes, in a housing 12 as shown in FIG. 1, plural magnetic discs 13 as a record carrier, a spindle motor 14, and a magnetic head part. Here, FIG. 1 is a plane view showing an internal structure of the HDD 11.

The housing 12 is made, for example, of aluminum die casting or stainless, and has a rectangular parallelepiped shape to which a cover (not shown) is coupled so as to seal its internal space. Each magnetic disc 13 in this embodiment has high recording density, such as 100 Gb/in$^2$ or higher, and is mounted on a spindle of the spindle motor 14.

The spindle motor 14 rotates the magnetic disc 13 at a high speed, such as 7,200 rpm and 10,000 rpm, and includes a brushless DC motor (not shown) and a spindle as its rotor part. For example, when two magnetic discs 13 are used, a disc, a spacer, a disc, and a clamp are stacked in this order on the spindle, and fixed by a bolt engaged with the spindle. Unlike this embodiment, the magnetic disc 13 may be a disc having a hub without a center hole, and the spindle rotates the disc through the hub.

The magnetic head part includes a slider 19, and an actuator that serves as a mechanism for positioning and driving the slider 19.

Figure 2:
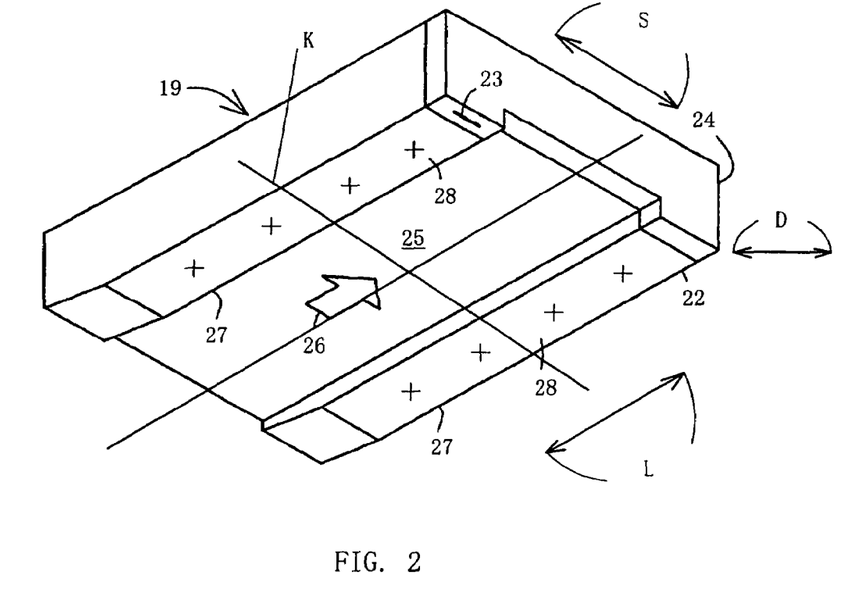
FIG. 2 is an enlarged perspective view of a slider of the hard disc drive shown in FIG. 1.

The slider 19 includes, as shown in FIG. 2, a slider body 22 having an approximately rectangular parallelepiped shape made of $Al_2O_3$—TiC (altic), and a head-device built-in film 24 united with at an air outflow end of the slider body 22 and made of $Al_2O_3$ (alumina), the film 24 including a built-in read/write head 23. Here, FIG. 2 is an enlarged perspective view of the slider 19. The slider body 22 and head-device built-in film 24 define a floatation surface 25 as a surface opposite to a carrier, i.e., the magnetic disc 13, which surface 25 catches air current 26 generated from the rotating magnetic disc 13.

A pair of rails 27 are formed on the floatation surface 25, extending from an air inflow end to the air outflow end. A so-called ABS 28 is defined at a top surface of each rail 27. The buoyancy is generated at the ABS 28 according to an act of the air current 26. The head 23 embedded in the head-device built-in film 24 exposes at the ABS 28. The floatation system of the slider 19 is not limited to this form, but may use a known dynamic pressure lubricating system, a known static pressure lubricating system, a known piezoelectric control system, and any other known floatation system. Unlike the instant embodiment which uses a contact start stop system in which the slider 19 contacts the disc 13 at the time of stop, the slider 19 may be lifted up over the disc 13 before the disc 13 stops held at a holding part (sometimes referred to as a ramp) located outside the disc 13 so as to hold the slider 19 in a non-contact manner with the disc 13, and dropped from the holding part over the disc 13 when the disc 13 runs, as in the dynamic or ramp loading system.

The head 23 includes a magnetoresistive/inductive composite head including an inductive head device for writing binary information into the magnetic disc 13 using a magnetic field induced by a conductive coil pattern (not shown), and a magnetoresistive ("MR" hereinafter) head device for reading resistance as binary information changing according to a magnetic field generated by the magnetic disc 13. The MR head device may use any type, such as a giant magnetoresistive ("GMR") type including both a Current in Plane ("CIP") structure and a Current Perpendicular to Plane ("CPP") structure, a tunneling magnetoresistive type ("TMR"), and an anisotropic magnetoresistive ("AMR") type.

As shown in FIG. 2, a crown represents a deformation or swelling on the slider 19 in a longitudinal direction L. A camber represents a deformation or swelling on the slider 19 in a transverse direction SD orthogonal to the longitudinal direction LD. A twist represents a deformation or swelling on the slider in a diagonal direction D. Exemplary deformations of the crown, camber and twist are indicated by a dotted line in each direction, and they may deform in opposite directions. Both directions may be discriminated by setting one direction to be plus and the other opposite direction to be minus. The instant embodiment thus uses the crown, camber and twist to evaluate a shape of the ABS 28. A measurement device may use a height or shape measuring device that uses optical interference fringes, and is commercially available, for example, from ZYGO's Interference System, VEECO's WYKO Series, etc.

In evaluation, the slider is determined to be a conforming article when all of the crown etc. are within a permissible range as a common difference (e.g., +8 nm) at a center of a reference value that is normally zero whereas the slider is determined to be a non-conforming article when one or more of the crown etc. are outside the permissible range. The shape evaluation method of the instant embodiment sets an orthogonal coordinate system K having an X-axis and Y-axis in the directions and S around the center of the floatation surface 25 as the origin. The measurement is conducted for a finite number of positions set in the orthogonal coordinate system K (for example, eight points x shown in FIG. 2). The regulation method of the floatation surface 25, which will be described later, usually sets the orthogonal coordinate system RC on the rear surface 25a of the floatation surface 25 because the laser is irradiated onto the rear surface of the ABS 28. However, the orthogonal coordinate system K set in the shape evaluation method may be formed at either side of the front and rear surfaces of the floatation surface 25.

Figure 3:
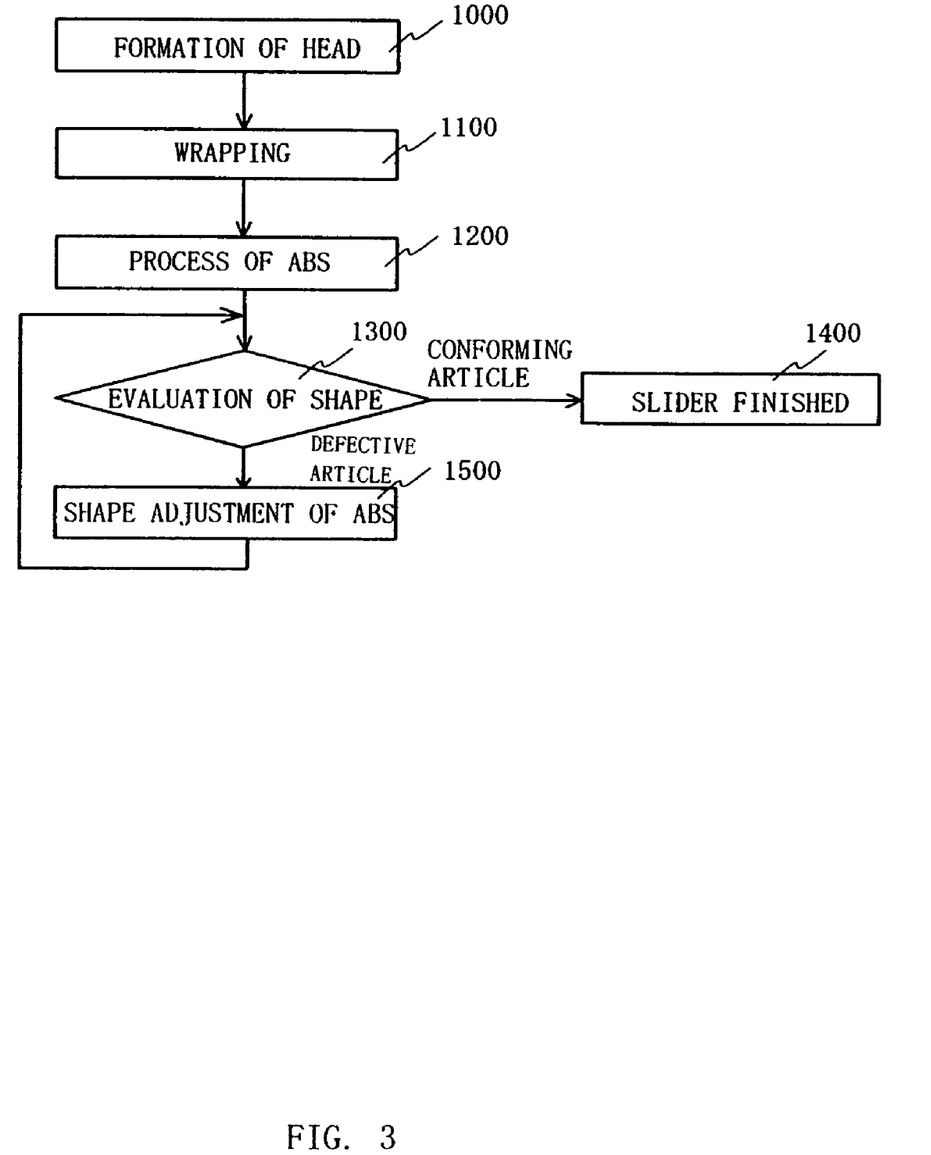
FIG. 3 is a flowchart for explaining an overview of a method for manufacturing the slider shown in FIG. 1.

A description will now be given of a method of the slider 19 with reference to FIG. 3. Here, FIG. 3 is a flowchart for explaining an overview of the method for manufacturing the slider 19. As illustrated, the method for manufacturing the slider 19 begins with a formation of the above head 23 in the head forming step (step 1000). Next, in the wrapping step before the rail-shaped ABS 28 is formed, the slider 19 is polished until the magnetic characteristic of the head 23 becomes a desired characteristic (step 1100). Next, in the ABS shape regulation step, the rails 27 are formed on the floatation surface 25 (step 1200). Then, the above shape evaluation method is used to evaluate a shape of the floatation surface 25 (step 1300). As a result of the shape evaluation, the slider is completed when each of the crown, camber and twist is maintained within the predetermined permissible range (step 1400), followed by an attachment to the suspension 18 and a connection to the wiring part for the head 23. The steps 1000-1200 may use any method known in the art, and a description thereof will be omitted.

As a result of the shape evaluation, the shape of the floatation surface 25 is regulated when one or more of the crown, camber and twist are outside the predetermined permissible range (step 1500). The step 1500 may use the inventive shape regulation method. Following the step 1500, the process is fed back to the shape evaluation step of the floatation surface 25 (step 1300) and repeated.

Figure 4:
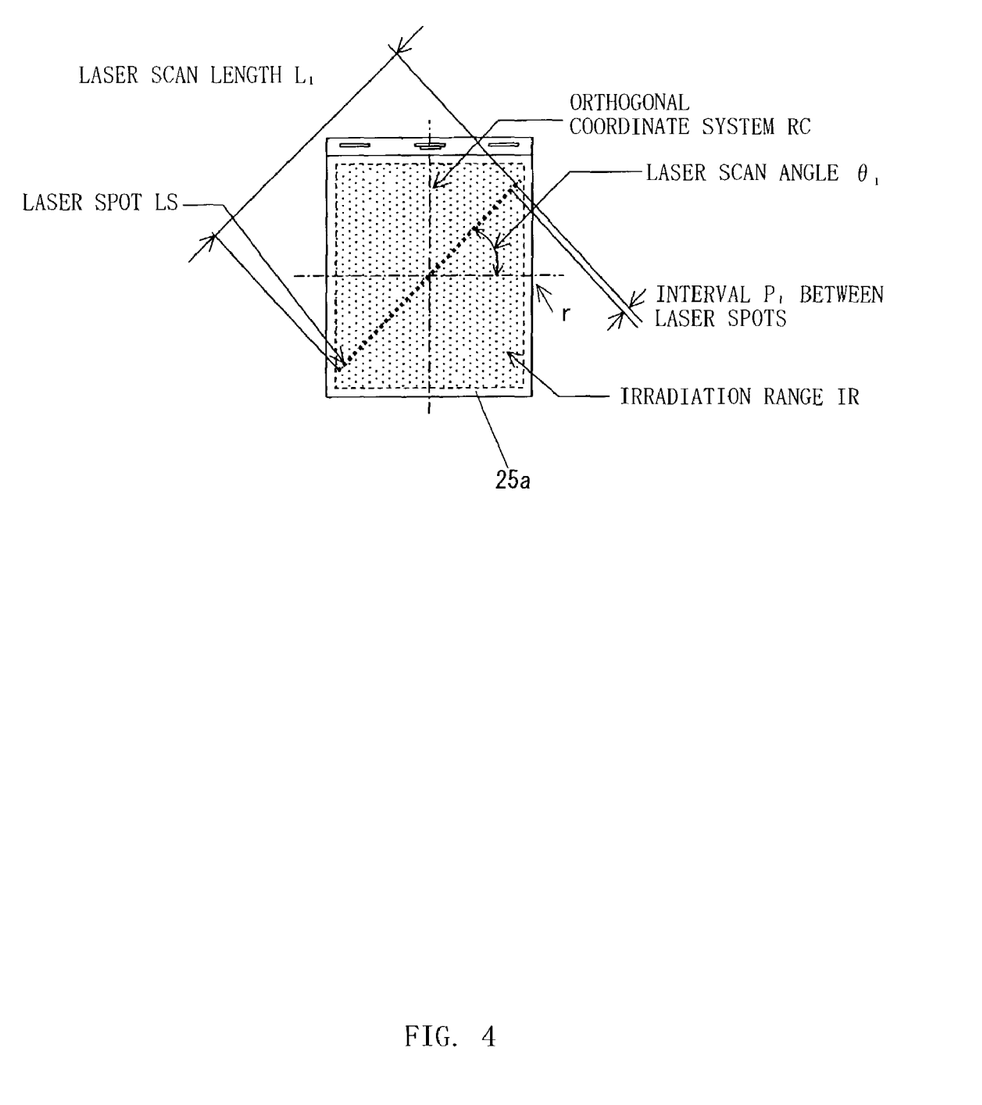
FIG. 4 is a plane view for explaining a method for setting a laser irradiation condition using an orthogonal coordinate system that has been set at the center of the rear surface of a floatation surface of the slider shown in FIG. 2.

Next follows a description of the inventive shape regulation method. Here, FIG. 4 is a plane view for explaining a method for setting a laser irradiation condition using the orthogonal coordinate system RC that has been set at the center of the rear surface 25a of the floatation surface 25.

The instant embodiment uses the orthogonal coordinate system RC that has been set at the center of the rear surface 25a of the floatation surface 25. As discussed above, the orthogonal coordinate system K is used to measure parameters including the crown, camber and twist. Setting of the orthogonal coordinate system and a finite number of measuring positions would simplify a target whose shape should be adjusted, and facilitate a set up, in a short time, of the laser irradiation position and angle necessary for the shape adjustment of the floatation surface 25 for a parameter which is outside the permissible range.

For example, the shape evaluation in the step 1300 measures the crown, camber and twist at eight points x in FIG. 2, and considers the slider 19 to be a conforming article when the crown, camber and twist are within the permissible range at these points even if there is unevenness, such as an undulation, between these points. Similarly, the correction in the step 1500 considers the slider 19 to be a conforming article when the crown, camber and twist are within the permissible range at these points even if there is unevenness, such as an undulation, between these points.

On the other hand, when the shape is adjusted without setting an orthogonal coordinate system and keeping the flatness at each of plural positions defined by the orthogonal coordinate system within the permissible range, the step 1300 needs longer time to determine whether or not the slider is a conforming article, because it is, for example, necessary to analyze the flatness of the entire floatation surface 25. This cannot easily setup the laser irradiation condition necessary to regulate the shape; such a correction process of the floatation surface 25 resultantly requires skill and thus becomes difficult. In particular, as the crown, camber and twist are interrelated with each other, the relationship among them would make the process more difficult.

In addition, the longer process time lower the yield of manufacturing of the slider 19.

On the contrary, the instant embodiment measures the flatness of the floatation surface 25 at a finite number of positions defined by the orthogonal coordinate system, and considers the entire floatation surface 25 to be flat when the crown, camber and twist are within the permissible range at these points, thereby simplifying the evaluation (step 1300) and the shape adjustment (step 1500). Therefore, a set up of the orthogonal coordinate system as in this embodiment would contribute to save measurement time, uniform process for the shape adjustment, and thus save process time. As described later, a laser scan angle is important for the shape adjustment method of this embodiment, and the orthogonal coordinate system is preferable since the scan angle may be easily set.

As shown in FIG. 4, the rear surface 25a has a range IR within which the laser may be irradiated, as defined by the reticulate and dotted line. Since the floatation surface 25 requires smoothness and dust caused by the laser irradiation causes crash, the instant embodiment irradiates the laser onto the rear surface 25a instead of the floatation surface 25.

The instant embodiment employs infrared and near infrared laser, for example, YAG laser having a wavelength of 1,064 nm. Since the laser is required to heat the rear surface 25a and cause its thermal expansion, that laser is preferable in view of the shorter process time rather than a range of the visible light and the ultraviolet light, which has a small output. It is preferable to select such laser as does not damage or shave the rear surface 25a.

The laser irradiation condition conceptually covers a laser oscillation condition, and thus includes an angle for scanning laser (e.g., $\theta_1$ in FIG. 4); a length for scanning the laser (e.g., $L_1$ in FIG. 4); an interval LS between laser spots (e.g., $P_1$ in FIG. 4); the number of pulses; the pulse energy; focusing; a position and the number of irradiations where the laser is irradiated at the position plural times; an angle, a moving amount, and the number of times where the laser is scanned at the constant angle, then the laser is moved by the moving amount in a direction perpendicular to a scanning direction of the laser, and the laser scan is repeated plural times; an angle and a moving amount where the laser is scanned at the constant angle, then the laser is moved by the moving amount in a direction perpendicular to a scanning direction of the laser while the moving amount is made variable; an angle for scanning the laser where plural angles are set; an angle for scanning the laser and a scan length where plural scan lengths are set for each angle; and an interval between laser spots of the laser and the number of times where plural intervals are set and the laser is scanned at a different interval plural times.

A description will now be given of the embodiment that corrects the floatation surface 25 by changing a scan angle $\theta_1$, with reference to FIGS. 5 and 6.

Characteristically, this embodiment takes a serious view of an angle for scanning the laser among the laser irradiation conditions, and determines an irradiation position. The floatation surface 25 includes the ABS 28 as a pair of rails 27 and a groove between them, but the target of the shape adjustment is the ABS 28. Here, FIG. 5 is a graph of the variance of the shape with respect to a crown, camber and twist when the laser is irradiated over the laser irradiation range IR by changing an angle for scanning the laser shown in FIG. 4. FIG. 6 is a flowchart for explaining one example of step 1500 shown in FIG. 3.

Figure 5:
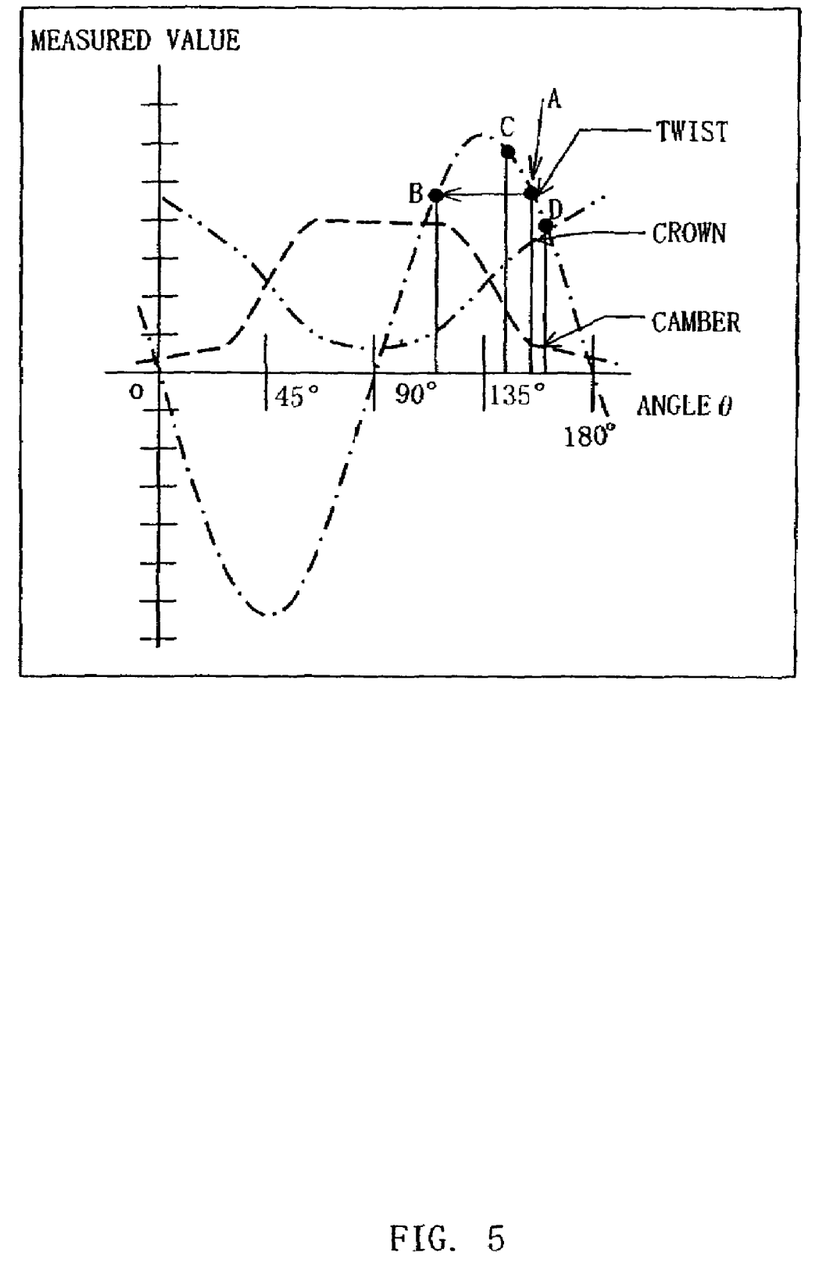
FIG. 5 is a graph of the variance of the shape with respect to a crown, camber and twist when the laser is irradiated with a variable angle for scanning the laser shown in FIG. 4.
Figure 6:
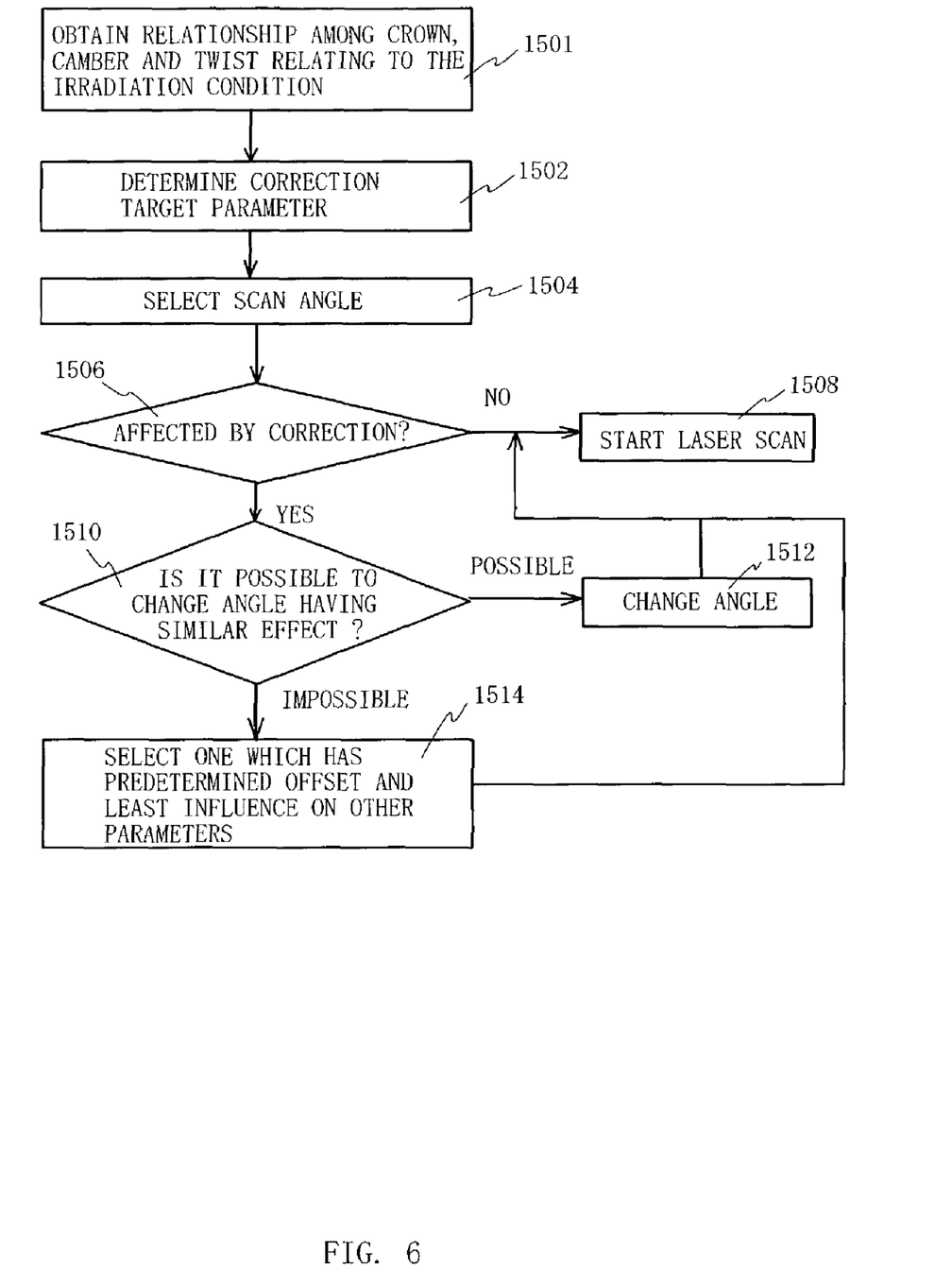
FIG. 6 is a flowchart for explaining one embodiment of step 1500 shown in FIG. 3.

The instant embodiment initially obtains a relationship among the crown, camber and twist when the laser is irradiated onto the rear surface 25a of the floatation surface 25 under a predetermined condition (which is an laser irradiation angle in this embodiment), that is, data shown in FIG. 5 (step 1501). The data shown in FIG. 5 varies depending upon a material and a shape of the slider 19, etc. The graph shown in FIG. 5 is directed to the slider as an evaluation object having a predetermined material and shape etc., and experimentally obtained from the crown, camber and twist by keeping constant the laser pulse energy, pulse width, etc. and changing only the angle for scanning the laser. The way of obtaining this graph constitutes one aspect of the present invention.

Then, a correction target parameter is determined among the crown, camber and twist (step 1502). Although this embodiment selects only one correction target parameter and usually selects as the target parameter, the parameter that has been determined to be outside the permissible range in the shape evaluation. When two or more parameters are determined to be outside the permissible range, more deviated parameter from the permissible range is selected as the correction target parameter. The present invention does not restrict the number of correction target parameters to one, but one correction target parameter would have an effect to facilitate the shape adjustment process.

The instant embodiment then selects a scan angle as the irradiation condition (step 1504). For example, when the twist is outside the permissible range and the crown and camber are within the permissible range, the twist is selected as the correction target. For example, the measurement result of the twist is −5 scales in FIG. 5, the laser is irradiated so that the twist may deform by +5 scales. For example, a point A is selected for moving the twist by +5 scales, and the scan angle corresponding to the point A (about 157.5° in FIG. 5) is selected. Another embodiment selects one or more irradiation conditions. For example, another embodiment that combines the number of irradiations and the scan angle with each other sets the number of irradiations to be 5 and irradiates the laser so as to deform the twist by +1 scale for each time.

It is then determined whether the scan angle negatively affects other parameters (step 1506). For example, when the scan angle of about 157.5° corresponding to the point A is selected, the correction of the twist would change the crown by about +3.3 and the camber by +0.7. The step 1506 determines whether such changes still keep the crown and camber within their permissible ranges.

When the step 1506 determines that there would be no influence, that is, when the instant embodiment determines that the correction of the twist would still keep the crown and the camber within their permissible ranges, the laser is scanned while $\theta_1$ is set to be about 157.5° (step 1508) in FIG. 4.

The step 1508 in the instant embodiment sets up laser irradiation conditions, such as the length $L_1$ of the laser scan shown in FIG. 4, the interval $P_1$ between laser spots, and laser focusing. The laser oscillation conditions, such as the laser pulse energy, pulse width, and wave control, have been set up in advance.

When the step 1506 determines there would be influence, it is then determined whether it is possible to change an angle having a similar effect (step 1510). For example, when the step determines that a correction of the twist makes the crown to be outside the permissible range, the step 1510 determines whether an angle corresponding to a point B (which is about 112.5° in FIG. 5) may be selected which provides the twist with +5 and does not affect the crown so much. When the step 1510 determines that the selection of the point B would keep the crown within the permissible range, the scan angle is changed from about 157.5° to about 112.5° (step 1512) and the laser is scanned similarly (step 1508).

On the other hand, when the step 1510 determines that it is impossible to change an angle having a similar effect, one among values made by adding and subtracting a predetermined offset, which is less influential on the other parameters is selected (step 1514). For example, when the step determines that even the selection of about 112.5° corresponding to the point B still keeps the crown outside the permissible range or makes the crown inside the permissible range but the camber outside the permissible range, the step 1510 determines that it is impossible to select the point B having the effect similar to the point B. In this case, the step 1514 selects a point C among points C and D made by adding and subtracting a predetermined offset angle (e.g., ±10°) to the point A. This is because the point C has a smaller crown value than the point D and less influence on the crown. The offset amount or angle is set in accordance with a material of the slider 19 and other conditions. The point C is about +5.2, but a number of laser scans are repeated if it is much lower than the desired correction value (which is +5 herein) (step 1508).

Another embodiment changes the correction target parameter in the step 1502 instead of the step 1514. Alternatively, the instant embodiment may change the irradiation condition in the step 1504.

Figure 7:
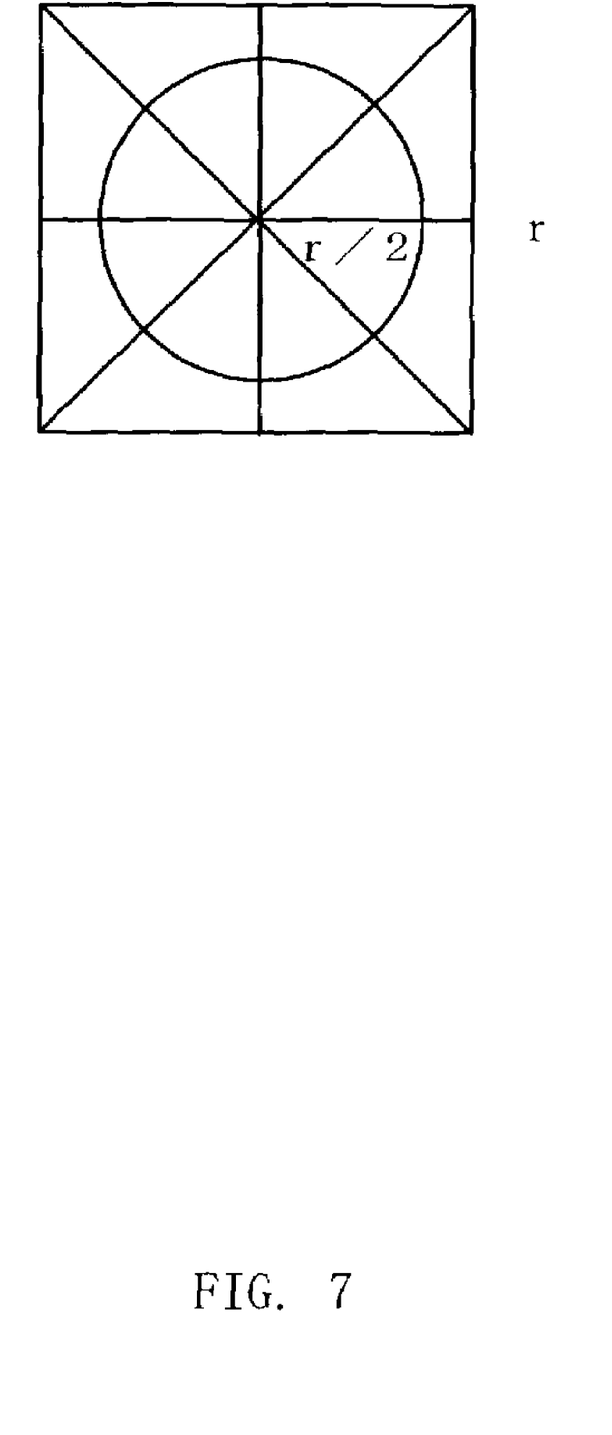
FIG. 7 is a plane view showing an embodiment that restricts a laser irradiation range shown in FIG. 4.

As shown in FIG. 7, the step 1508 does not have to irradiate the laser within a circular range having a predetermined radius. Since the rails 27 are apart from the center, it has been experimentally confirmed that the laser irradiation within this range does not effectively adjust the shape of the ABS 28. The predetermined radius may be obtained experimentally. For example, where the irradiation range IR has a square outline apart from the origin in the orthogonal coordinate system RC by a distance r, "the circle having a predetermined radius" would be defined as a circle having a radius of r/2 or less. FIG. 7 shows such a circle.

A description will be given of a shape regulation method using other irradiation conditions.

Figure 8:
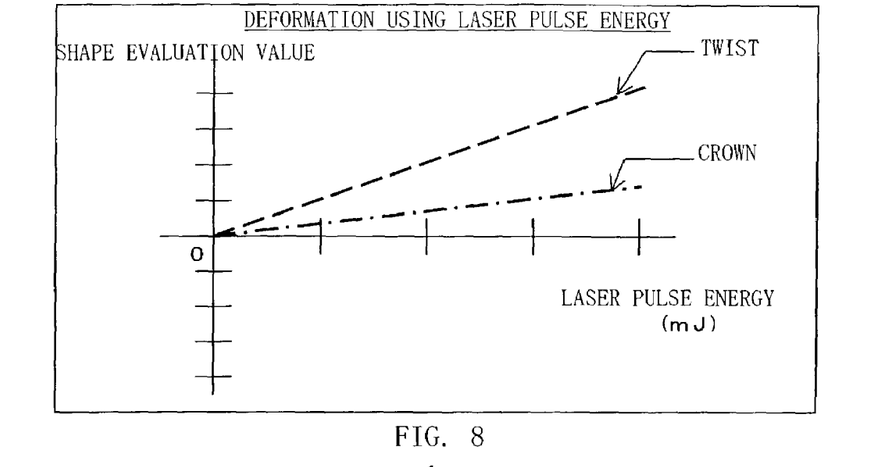
FIG. 8 is a graph of the variance of the shape with respect to a crown and twist when the laser is irradiated with variable laser pulse energy.

FIG. 8 is a graph of the variance of the shape when the laser is irradiated by changing the laser pulse energy and keeping constant the other laser oscillation and irradiation conditions. FIG. 8 omits the camber. The instant inventor has confirmed that changing of the laser focusing instead of the laser pulse energy would also exhibit similar deformation of the shape to the change of the laser pulse energy. In changing the laser pulse energy and laser focusing, angles in the steps 1504, 1510 and 1512 are replaced with the laser pulse energy and laser focusing. The step 1501 in FIG. 6 measures the variance of the shape when only the pulse energy is changed with respect to the crown, camber and twist.

Figure 9:
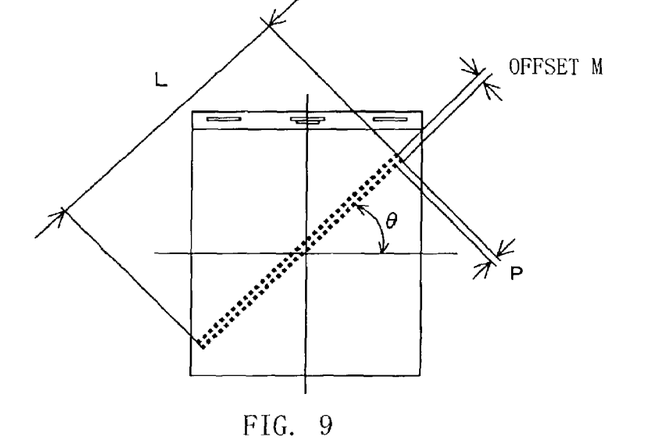
FIG. 9 is a plane view of one embodiment in which the laser scan is repeated under the same condition after offset in a normal direction of a scan angle shown in FIG. 4.
Figure 10:
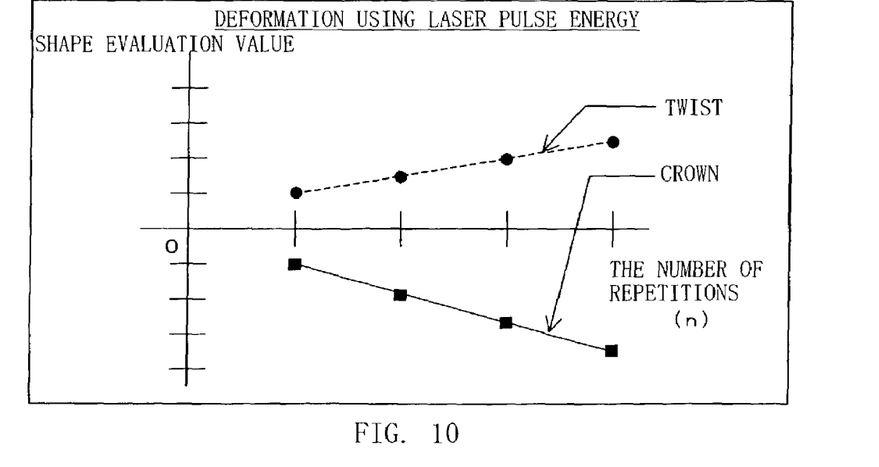
FIG. 10 is a graph of the variance of the shape obtained from the laser scan in the embodiment shown in FIG. 9.

FIG. 9 is a plane view of when the laser scan is repeated under the same condition by moving by an offset M in a normal direction of the scan angle $\theta_1$ shown in FIG. 4, while FIG. 10 is a graph showing the variance of the shape as the result of laser scan. FIGS. 9 and 10 also omit the camber. In the repetitive process, angles in the steps 1504, 1510 and 1512 are replaced with angles, offset M, scan length L, and the number of repetitions n. The variance of the shape is in proportion to the number of repetitive processes n.

Figure 11:
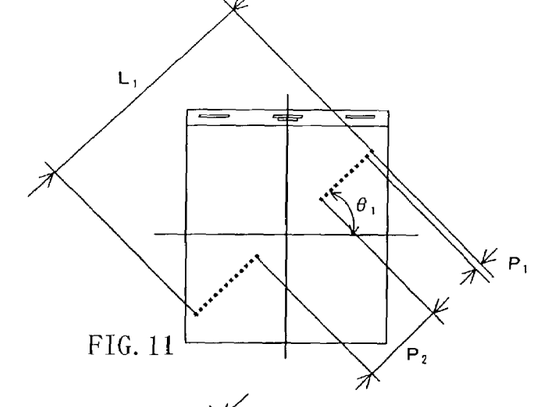
FIG. 11 is a plane view showing one embodiment that combines some laser irradiation conditions.
Figure 12:
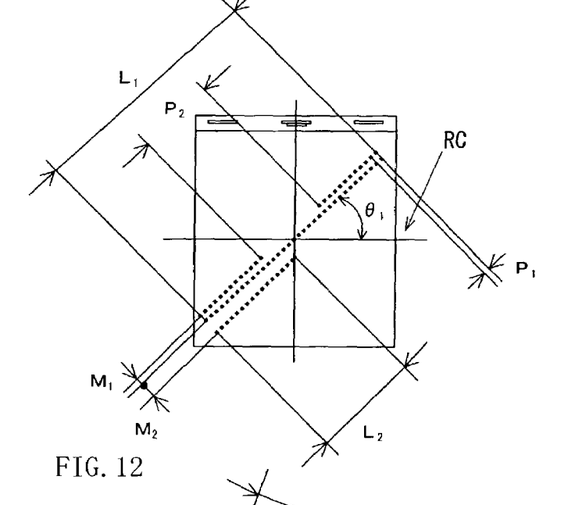
FIG. 12 is a plane view showing another embodiment that combines some laser irradiation conditions.
Figure 13:
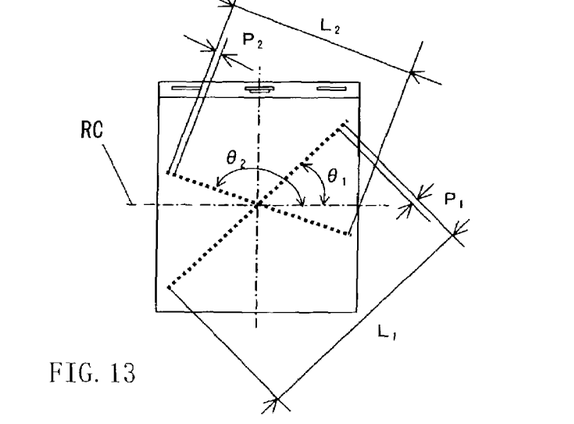
FIG. 13 is a plane view showing still another embodiment that combines some laser irradiation conditions.

FIGS. 11-13 are plane views showing exemplary laser scans which combine some conditions including the laser scan angle θ, the laser irradiation interval P, the laser scan length L, and the offset M, etc. among the aforementioned shape deformation conditions.

As described with reference to FIG. 7, FIG. 11 does not irradiate the laser in the center portion having the diameter $P_2$ and uses the laser scan angle $\theta_1$ the laser scan length $L_1$, and the laser-spot intervals $P_1$.

In FIG. 12, the laser scan that passes the origin of the orthogonal coordinate system RC uses the laser scan angle $\theta_1$, the laser scan length $L_1$, and the laser-spot intervals $P_1$. In addition, the laser scan that has been moved by the offset $M_1$ in a nominal direction (in the upper left direction) of the scan angle $\theta_1$ does not irradiate the laser in the center portion having the length $P_2$ and uses the same conditions as those of the laser scan that passes the origin of the orthogonal coordinate system RC. Moreover, the laser scan has been moved by the offset $M_2$ in the nominal direction (in the lower right direction) of the scan angle $\theta_1$ does not irradiate the laser beyond the longitudinal axis in the orthogonal coordinate system RC and uses the same conditions as those of the laser scan that passes the origin of the orthogonal coordinate system RC.

In FIG. 13, one of two laser scans passing the origin of the orthogonal coordinate system RC scans the laser with the laser scan angle $\theta_1$, the laser scan length $L_1$, and the laser-spot intervals $P_1$, while the other scans the laser with the laser scan angle $\theta_2$, the laser scan length $L_2$, and the laser-spot intervals $P_2$.

Turning back to FIG. 1, the actuator includes a voice coil motor (not shown in FIG. 1), a support shaft 15, and a carriage 16.

The voice coil motor may use any technology known in the art, and a detailed description thereof will be omitted herein. For example, the voice coil motor includes a permanent magnet fixed onto an iron plate fixed in the housing 12, and a mobile magnet fixed onto the carriage 16. The support shaft 15 is inserted into a cylindrical hollow hole in the carriage 16, and arranged such that it extends perpendicular to the paper surface in FIG. 1 in the housing 12.

The carriage 16 includes a rigid arm 17 rotatably or swingably around the support shaft 15, and a suspension 18 that is attached to a tip of the arm 17 and extends forward from the arm 17. The suspension 18 is, for example, a Watlas type suspension made of stainless, which uses a gimbal spring (not shown) to cantilever the slider 19. The suspension 18 supports a wiring part connected to the slider 19 through a lead, etc. Since the wiring part is so small that it is omitted in FIG. 1. The sense current, read-in data, read-out data are supplied and output between the head 23 and the wiring part through such a lead. The suspension 18 applies an elastic force to the slider 19 against a surface of the magnetic disc 13.

The HDD 11 includes as a control system (not shown) a control part, an interface, a hard disc controller (referred to as "HDC" hereinafter), a write modulation part, a read demodulation part, and a head IC. The control part covers any processor such as a CPU and MPU irrespective of its name, and controls each part in the control system. The interface connects the HDD 11 to an external apparatus, such as a personal computer ("PC" hereinafter) as a host. The HDC sends to the control part data that has been demodulated by the read demodulation part, sends data to the write modulation part. The control part or HDC achieve servo control over the spindle motor 14 and (a motor in) the actuator. The write modulation part modulates data and supplies data to the head IC, which data has been supplied from the host through the interface and is to be written down onto the disc 13 by the inductive head. The read demodulation part demodulates data into an original signal by sampling data read from the disc 13 by the MR head device. The write modulation part and read demodulation part may be recognized as one signal processing part. The head IC serves as a preamplifier.

In operation of the HDD 11, the control part drives the spindle motor 14 and rotates the disc 13. The airflow associated with the rotation of the disc 13 is introduced between the disc 13 and slider 19, forming minute air film and thus generating the buoyancy that enables the slider 19 to float over the disc surface. The suspension applies the elastic pressure onto the slider 19 in a direction against the buoyancy of the slider 19. The balance between the buoyancy and the elastic force spaces the slider 19 from the disc 13 by a constant distance. As discussed above, since the inventive method has processed a shape of the floatation surface 25 (in particular, the ABS 28) of the slider 19 and provided the desired flatness with that, the slider 19 may maintain a stable floatation amount.

The control part then controls rotates the carriage 16 around the support shaft 15 and enables the head 23 to seek for a target track on the disc 13. The instant embodiment thus uses a swing arm type in which the slider 19 draws an arc locus around the support shaft 15, but the present invention is applicable to a linear type in which the slider 19 is a linear locus. As discussed above, the slider 19 has the stable floatation amount and thus may realize a stable and quick seek.

In the write time, the control part receives data from the host such as a PC through the interface, selects the inductive head device, and sends data to the write modulation part through the HDC. In response, the write modulation part modulates the data, and sends the modulated data to the head IC. The head IC amplifies the modulated data, and then supplies the data as write current to the inductive head device. Thereby, the inductive head device writes down the data onto the target track.

In the read time, the control part selects the MR head device, and sends the predetermined sense current to the MR head device through the HDC. Data is amplified by the head IC based on the electric resistance of the MR head device varying according to a signal magnetic field, and then supplied to the read demodulation part to be demodulated to an original signal. The demodulated signal is sent to the host (not shown) through the HDC, controller, and interface.

The instant embodiment stabilizes the floatation amount of the slider 19 and consequently recording and reproducing operations, avoiding defective reading and writing.

As discussed above, the process method of the instant embodiment may supply the slider with a minute shape deformation for an appropriate shape, and may provide a slider having the stable floatation amount.

Further, the present invention is not limited to these preferred embodiments, and various modifications and changes may be made in the present invention without departing from the spirit and scope thereof. For example, combinations of the irradiation conditions are not limited to the above embodiments. In addition, although the instant embodiments refer to a HDD, the present invention is applicable to any type of disc drive (such as an optical disc drive).

A method for manufacturing a slider according to the present invention may provide a slider having a desired floatation amount apart from a record carrier. The present invention uses an orthogonal coordinate system or a measurement result of the crown, camber and twist to regulate a shape of the slider in relatively short time through a uniform process.

What is claimed is:

1. A method for manufacturing a slider including a head for recording data into and reproducing data from a record carrier, and a floatation surface that floats above opposite to the record carrier, said method comprising the steps of:

determining a correction target from among parameters based on a measurement result about the parameters, when the measurement result shows that at least one of the parameters deviate from a permissible range, the parameters including a crown representative of a deformation of the floatation surface in a longitudinal direction, a camber representative of a deformation of the floatation surface in a transverse direction orthogonal to the longitudinal direction, and a twist representative of a deformation of the floatation surface in a diagonal direction, the correction target being one of the parameters which is most deviated from the permissible range;

determining a correction amount of the correction target based on the measurement result;

setting an angle for scanning a laser to be irradiated onto a rear surface of the floatation surface so as to correct the correction target based on the correction amount and a shape changing relationship of the floatation surface among the angle and the crown, the camber, and the twist;

judging whether a shape change of the parameter other than the correction target falls within the permissible range based on the shape changing relationship if the laser is irradiated at the angle onto the rear surface of the floatation surface;

changing the angle to another angle having a similar effect based on the shape changing relationship when said judging step determines that the parameter other than the correction target falls outside the permissible range; and regulating a shape of the floatation surface by linearly irradiating the laser at one of the angle or the other angle onto the rear surface of the floatation surface, wherein where an orthogonal coordinate system having first and second coordinate axes is set on the floatation surface of the head, the first coordinate axis being aligned with a width or traverse direction of the head, the second coordinate axis being aligned with a longitudinal direction of the head, a center of the floatation surface is set as an origin of the orthogonal coordinate system, the angle or the other angle being an angle between the second coordinate axis and a linearly irradiated laser that passes the origin, and the linearly irradiated laser being inclined with respect to the second coordinate axis.

2. A drive which drives a record carrier, said drive comprising:

a head for recording data into and reproducing data from the record carrier; and a slider, mounted with said head, which includes a floatation surface that floats above the record carrier, said slider being manufactured by a method according to claim 1.

* * * * *